United States Patent Office 2,719,995
Patented Oct. 11, 1955

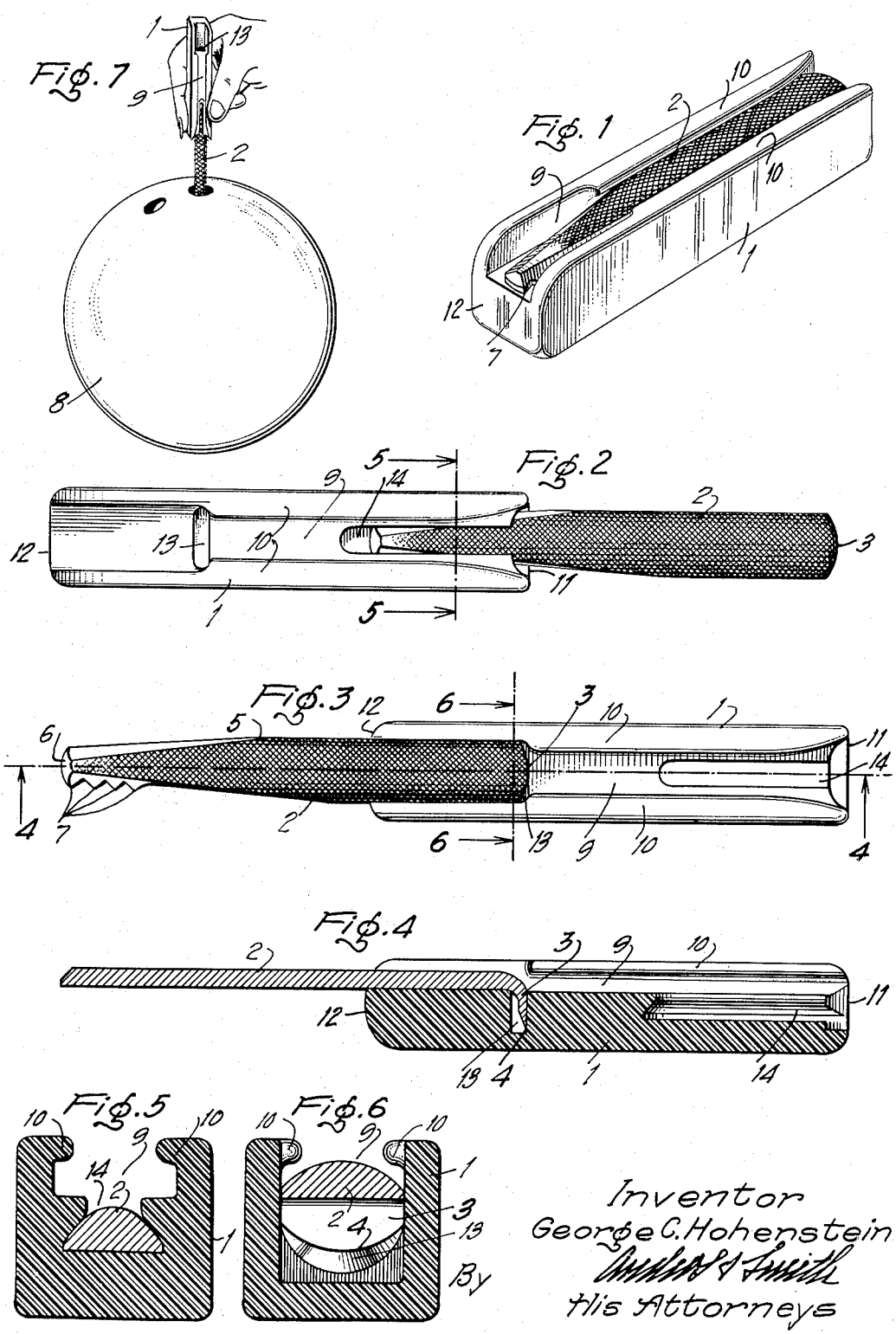

2,719,995
TOOL FOR USE BY BOWLERS

George C. Hohenstein, Albany, N. Y.

Application May 17, 1952, Serial No. 288,494

3 Claims. (Cl. 15—105)

My invention relates to tools and more particularly to a tool especially adapted for use by bowlers in altering the holes in a bowling ball to suit their individual requirements.

One of the objects of my invention is to provide a small tool and a combined container and handle therefor which may be carried in the pocket and which is adapted to smooth the interior of the holes in a bowling ball by which the ball is gripped to enlarge, vary the shape thereof, or form grooves therein whereby a more positive grip on the ball is obtained.

I accomplish these objects by means of the novel combination of elements described below and illustrated in the accompanying drawings in which—

Fig. 1 is a perspective view of my tool and the combined container and handle therefor;

Fig. 2 is a plan view of the elements of the tool assembled in one way;

Fig. 3 is a view similar to Fig. 2 with the elements assembled in another way;

Fig. 4 is a section of Fig. 3 in the plane 4—4;

Fig. 5 is a section of Fig. 2 in the plane 5—5;

Fig. 6 is a section of Fig. 3 in the plane 6—6; and

Fig. 7 is a perspective view illustrating how the tool is used.

Referring to the drawings—

My device comprises a combined handle and container element 1 which is preferably formed of a synthetic resin or plastic, and a tool 2 which is carried in the handle, as shown in Fig. 1, when not in use, but which is inserted in the handle, as shown in Figs. 2 and 3, when it is to be used.

The tool 2 comprises an elongated, half-round file having a portion 3 (see Figs. 4 and 6) at one end thereof projecting from the flat side of said file and which is provided with an arcuate, scraping edge 4 at the bottom thereof. Beginning in a zone 5 (see Fig. 3) intermediate the ends thereof, the file is tapered laterally toward the end thereof opposite the depending portion 3 and one of the lateral edges immediately adjacent the end 6 is provided with a plurality of sharp teeth adapted to form grooves or scores in the wall of a hole in a bowling ball, such as shown at 8 in Fig. 7.

The top of the handle or container 1 is provided with a longitudinally extending channel 9 therein which is open at both ends, and partially dovetailed intermediate its ends, as shown at 10. The channel 9 is adapted to receive and frictionally to hold the tool when slid therein until the depending portion 3 contacts the end 11 of the handle, thus limiting the extent to which the tool may be inserted in the handle when not in use.

Adjacent the opposite end 12 of the handle, the bottom of the channel 9 is provided with a transversely extending slot 13 adapted to receive the projecting portion 3 of the tool and hold it in said handle with the major portion thereof projecting from said end 12, as shown in Figs. 3 and 6. When assembled in this way, the wall of a hole may be grooved or scored by means of the teeth 7 and the file surface may be used in the usual manner although, where the file surface is to be used, the tool and handle would ordinarily be assembled as shown in Figs. 2 and 5. When the tool and handle are assembled as shown in Figs. 3, 4 and 6, pressure on the teeth 7 is in a direction transverse of the file which does not tend to force it out of the handle, and the pressure of the thumb on that portion of the file within the handle is sufficient to prevent displacement in a direction normal to the flat surface thereof.

When it is desired to use the projecting portion 3 as a scraper, the handle 1 is provided with a recess 14 extending longitudinally of the handle and opening into the end 11 thereof. This recess is adapted to receive and frictionally or wedgingly engage the tapered end of the tool 2, as shown in Figs. 2, 5 and 7. Although the recess 14 is shown open at the top, it may, of course, be closed by increasing the depth or thickness of the handle. When assembled, as shown in Figs. 2, 5 and 7, the projecting scraper edge 4 may be used to clean the walls of the holes.

From the foregoing it will be apparent that I have provided a simple, inexpensive tool by means of which any bowler may modify the finger holes in a bowling ball to suit his particular grip; may form scores or grooves in the walls of the hole to provide a better grip; and may maintain the walls of the holes free of any foreign matter.

What I claim is:

1. In a tool adapted for use by bowlers for altering the holes in a bowling ball, the combination with an elongated, half-round file tapering laterally towards one end thereof and having a portion at the other end projecting substantially at a right angle from the flat side thereof and provided with a sharpened arcuate edge adapted for use in scraping the wall of a hole in a bowling ball; of a container therefor formed of a plastic and comprising an elongated element having a longitudinally-extending, dovetailed channel in one side thereof in which said file is positioned and frictionally held with said projecting portion abutting an end of said container; the bottom of said channel adjacent one end of said container being provided with a transverse slot adapted to receive said projecting portion and hold said file in said container with the major portion thereof projecting from said adjacent end and thus to form a handle for said file when in use.

2. The structure set forth in claim 1 in which the tapered portion of said file is provided adjacent the free end thereof with a plurality of sharp teeth on one side thereof adapted to form grooves in the wall of a hole in a bowling ball when said container is functioning as a handle for said file having the tapered end of said file projecting therefrom.

3. In a tool adapted for use by bowlers for altering the holes in a bowling ball, the combination with an elongated, half-round file tapering laterally towards one end thereof and having a portion at the other end projecting substantially at a right angle from the flat side thereof and provided with a sharpened arcuate edge adapted for use in scraping the wall of a hole in a bowling ball; of a container therefor formed of plastic and comprising an elongated element having a first, longitudinally-extending dovetailed channel in one side thereof in which said file is positioned and frictionally held with said projecting portion abutting an end of said container; said container adjacent one end thereof being provided with a second, dovetailed channel below said first channel and extending longitudinally of said container from one end thereof adapted to receive and hold in frictional engagement the tapered portion of said file when pushed therein with the other portions of said file projecting therefrom and thus to function as a handle for said file.

References Cited in the file of this patent

UNITED STATES PATENTS

| | | |
|---|---|---|
| 778,650 | Forquignon | Dec. 27, 1904 |
| 1,507,632 | Taylor | Sept. 9, 1924 |